Patented Apr. 7, 1942

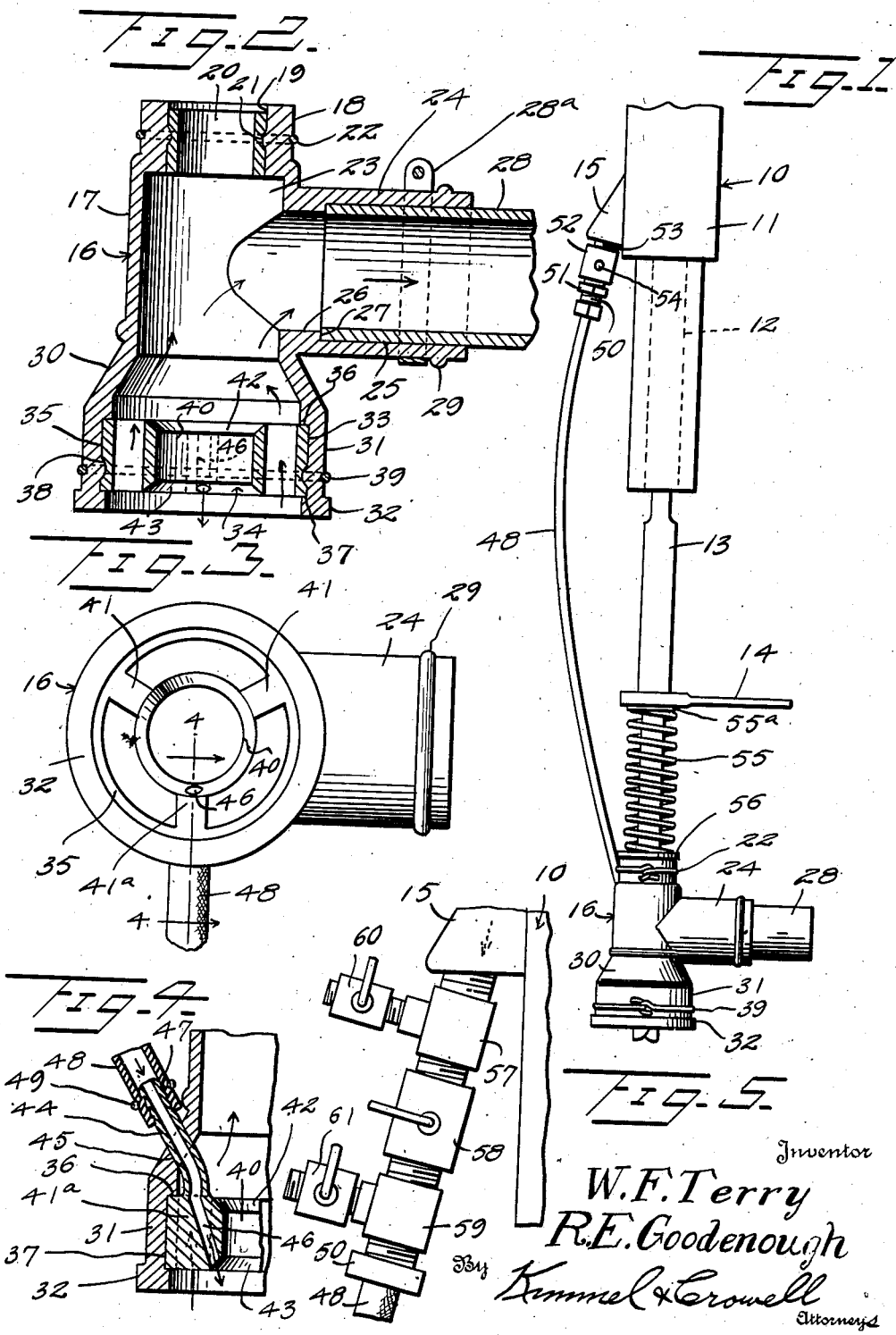

2,279,186

UNITED STATES PATENT OFFICE 2,279,186

COMBINED DUST COLLECTOR AND DRILL HOLE CLEANER

Warren Franklin Terry, West Somerville, Mass., and Russell Edward Goodenough, Northfield, Vt.

Continuation of application Serial No. 338,436, June 1, 1940. This application January 10, 1941, Serial No. 374,014

8 Claims. (Cl. 255—50)

This invention relates to dust collectors designed particularly for use with stone drills for eliminating the flying stone dust formed about the drill during the drilling operation.

This invention is a continuation of our co-pending application, Serial Number 338,436, filed June 1, 1940 (since abandoned).

At the present time in stone drilling operations where a reciprocating or other type of drill is used, and particularly where a pneumatic hammer is used, an unhealthy cloud of dust is produced about the drill so that the operator must wear a mask or other device to eliminate the possibility of breathing in the flying stone dust. In addition to this, the flying dust impairs the vision of the operator and also affects the efficiency of the operator as well as other persons near the drill. Collectors have heretofore been produced using as a basic suction or negative pressure for collecting the dust about the drill, but in most cases such collectors are cumbersome and do not agitate the dust or fine particles as they are formed in the hole at the working end of the drill bit and for this reason do not clean the hole as it is formed. This is especially true after the bit has formed a hole of one or more inches in depth.

Furthermore, certain known devices are designed for use only with one kind of a drill bit, that is a hollow drill bit, and cannot be used with any other kind, such as a solid drill bit. It is, therefore, an object of this invention to provide a combined dust collector and hole cleaner which does not depend for its efficiency upon one kind of drill bit, but will work equally as well with either a hollow or solid drill bit.

Other collectors of this type are so constructed that the efficiency of their operation depends upon the pressure applied thereto by a tensioning means engaging about the drill bit for holding the collecting hood against the work. It is a further object of this invention to provide a collecting device which may be used with or without any tensioning device and will work equally as well when the collecting hood is spaced from the work a slight distance.

A still further object of this invention is to provide a dust collecting device of this kind wherein the dust agitating medium is formed by the intermittent or pulsating exhaust of air pressure from the pneumatic air hammer.

A further object of this invention is to provide in a device of this kind, means whereby only a portion of the exhausted air from the hammer is used to agitate the dust, the amount of exhaust air pressure used depending upon the size of the hammer and the amount of air pressure necessary to operate the hammer.

A further object of this invention is to provide a device which may be used with either reciprocating or rotary drills.

A further object of this invention is to provide a device of this kind which may be used with any desired fluid pressure such as liquid, air or other gaseous pressure.

A further object of this invention is to provide a collector which may be used with a pneumatic hammer and the exhaust air from the hammer used during a portion or all of the time of the drilling operation, or if desired a liquid may be discharged into the hole and removed therefrom with the cuttings, and the exhaust air discharged into the atmosphere.

A further object of this invention is to provide a suction collector and agitator which will not only agitate and remove the dust and cuttings but also the atmospheric impurities which arise in the drilling of material other than rock, such as plastics or the like.

A further object of this invention is to provide a dust collector and hole cleaner which may be used for vertical, horizontal or oblique drilling.

To the foregoing objects and to others which may hereinafter appear, the invention consists of the novel construction, combination and arrangement of parts as will be more specifically referred to and illustrated in the accompanying drawing wherein are shown embodiments of the invention, but it is to be understood that changes, variations and modifications may be resorted to which fall within the scope of the invention as claimed.

In the drawing:

Figure 1 is a detail side elevation of a combined dust collecting and drilling hole cleaning device constructed according to an embodiment of this invention, the device being shown in applied position on a pneumatic drill which is shown fragmentarily.

Figure 2 is a vertical section through the suction hood,

Figure 3 is a bottom plan of the device,

Figure 4 is a fragmentary sectional view taken on the line 4—4 of Figure 3, and

Figure 5 is a fragmentary side elevation of a modified form of the air or fluid pressure regulating device.

Referring to the drawing, the numeral 10 designates generally a pneumatic hammer which is provided with a pressure cylinder 11 and a reciprocating hammer 12 which projects downwardly from the cylinder 11. A drill bit 13 is removably mounted in the lower end of the hammer 12 and a bit rotating handle 14 loosely engages the bit 13 below the hammer 12. The cylinder 11 adjacent the lower end thereof is provided with a laterally projecting and downwardly directed exhaust outlet 15 through which the exhausted air from the cylinder 11 is adapted to pass to the atmosphere.

A combined suction and pressure hood generally designated as 16 is mounted about the lower end portion of the drill bit 13 and is adapted when in operative position to engage the outer face of the work. The hood 16 comprises a vertically disposed cylindrical body 17 which at its upper end is provided with a reduced neck 18 which is formed with a drill receiving opening 19. The opening 19 is coaxial with the axis of the hood 17 and in order to provide a means whereby the wall of the opening 19 will not become unduly worn by action of the drill bit 13 working therein, we have provided a cylindrical metallic bearing 20, which is mounted within the opening 19.

The hood 16 is preferably formed of rubber or other yieldable composition material and by providing a metallic bearing in the form of a sleeve bearing 20 within the neck 18, the reciprocating movement of the drill bit 13 will not materially affect the sliding fit of the bearing or sleeve 20 about the bit. The sleeve or bearing 20 on its outer surface is provided with an annular groove 21 and the sleeve 20 is firmly held within the neck 18 by means of a clamping ring 22 which is adapted to compress the neck 18. In this manner, the sleeve 20 will be held against endwise movement relative to the neck 18.

The body 18 is substantially larger in diameter than the diameter of the sleeve 20 so as to thereby form a suction chamber 23 below the neck 18. A right angularly disposed and laterally projecting suction nipple 24 is formed integral with the body 17 and communicates at its inner end with the suction chamber 23. The nipple 24 is provided with a bore 25 which is substantially larger in diameter than the bore 26 which communicates with the suction chamber 23 thereby forming an annular shoulder 27 inwardly from the outer end of the nipple 24. A suction connecting member 28 is adapted to frictionally engage within the bore 25 and abut against the shoulder 27 and may be tightly held in the bore 25 by means of a clamping band 28a. The connector or coupling 28 is adapted to be connected to a suitable source of suction which may be disposed at a point remote from the hammer 10. The nipple 24 at a point inwardly from the outer end thereof is provided with an annular reinforcing bead 29.

The hood 16 is formed with a frusto-conical extension 30 which extends downwardly from the lower end of the body 17 and terminates in a cylindrical hood member 31. The cylindrical hood member 31 at its lower end is formed with an annular flange 32 and on the interior thereof, the cylindrical hood member 31 is provided with an annular seat 33. The tapering construction of the extension 30 of the hood 16 at the bottom thereof causes the air entering the hood between the flange 32 and the surface of the work, as well as air, dust and cuttings withdrawn from the hole formed by the drill to assume a whirling movement which rises under the suction from the suction nipple 24. A distributing member generally designated as 34 is mounted in the hood member 31 and is provided with a cylindrical outer body 35 which snugly engages within the seat 33. The hood member 31 is formed with upper and lower internal annular shoulders 36 and 37 against which the opposite ends of the cylindrical supporting member 35 are adapted to engage when member 35 is positioned against the seat 33. The cylindrical supporting member 35 on its outer surface is provided with an annular groove 38 and an annular clamping band or ring 39 is tightly disposed about the outer surface of the hood member 31 and is adapted to press or distort a portion of the hood 31 into the annular groove 38 so that the supporting member 35 will be firmly held within the hood member 31. The flange 32 provides a cushioning means for normally holding the distributing member 34 out of contact with the work, so that the distributing member 34 will not be injured by contact with the work.

A drill bit guiding member 40 of substantially smaller diameter than the supporting member 35 is disposed concentrically of the supporting member 35 and is supported in concentric relation to the supporting member 35 by means of a plurality of radially arranged supporting arms 41 which are formed integral with or welded to the supporting member 35 and the guiding member 40. The guiding member 40 is bevelled as at 42 on its upper edge, the bevel 41 being directed inwardly and a lower inwardly directed bevel 43 is provided on the lower end of the guiding member 40.

An upwardly and outwardly directed nipple or tubular member 44 is connected to one of the arms 41 and extends outwardly through the frusto-conical hood portion 30 through an opening 45. The arm 41a to which the nipple 44 is connected is provided with a fluid passage 46 which opens through the lower bevel 43 of the bit guiding member 40. The outer or upper end of the nipple 44 is provided with a plurality of annular ribs 47 and one end of a pressure hose or conduit 48 is clamped about the ribs 47 by means of an annular clamping member 49. The other or upper end of the conduit 48 is secured in a connector 50 which engages in a reducing bushing 51. The reducing bushing 51 is threaded into a cylindrical fluid pressure metering member 52. The metering member 52 is provided with a threaded nipple 53 which is threaded into the exhaust member 15.

The metering member 52 is provided with a fluid outlet port 54 which is of sufficient size so that the desired quantity of fluid from the cylinder 11 may be discharged into the atmosphere and the remaining amount of fluid discharged through the exhaust member 15 is adapted to pass downwardly through the hose or conduit 48 and be discharged through the fluid passage 46 and about the lower portion of the drill bit 13.

Where the hammer 10 is used in a horizontal position so as to drill a horizontally disposed hole, the hood 16 may be held against the outer face of the work by means of a spring 55 which is disposed loosely about the bit 13 and at its upper end bears against a washer 55a engaging against the underside of the bit rotating member 14. The lower end of the spring 55 bears against a washer 56 which is positioned loosely about the bit 13 and engages against the upper end of the neck 18. The spring 55 will force the rotating member 14 in the direction of the operator 10 and as the drill bit 13 progresses inwardly, the spring 55 will be compressed so as to thereby hold the hood 16 in contacting relation with the face of the work. Where the hammer 10 is used in a vertical position, the spring 55 may, if desired, be omitted. With the use of this device, it is not essential that the hood 16 snugly engages at its lower end against the face of the work as the hood may be positioned in slightly spaced relation with respect to the face of the work and still operate in an efficient manner.

In Figure 5 is illustrated an air or pressure regulating device not of the fixed type shown in Figure 1, the operation of which is as follows:

At the time the valve member 58 is turned to cut off the flow of fluid pressure from the exhaust member 15 to the pressure hose 48, the valve member 60 is adapted to be turned so as to permit the discharge of fluid pressure from the drill 10 into the atmosphere. The valve 61 may be connected to a fluid pressure source so that a liquid or air under pressure may be discharged through the hose 48 into the hood 16 about the drill bit in such cases as when hood 16 is used with a drill operated with means other than air. In this manner the liquid will be discharged through the passage 46 about the lower portion of the drill bit 13 and into the hole formed by the drill bit. With a construction as shown in Figure 5, the fluid pressure such as air or the like from the hammer 10 may be initially used during the drilling of the hole with the valve members 60 and 61 cut off and the valve 58 open. Valve 60 may be used as a metering valve and may if desired be turned so as to release a predetermined quantity of air into the atmosphere. The valve arrangement shown in Figure 5 will permit the use of fluid pressure from the drill 10 or fluid pressure from a separate source or both sources simultaneously.

The agitated dust and cuttings will rise in the hole about the drill bit and will be drawn upwardly into the hood 16 by the suction from the connecting member 28. It will be apparent that where the drill bit 13 is working in a material from which gases will be generated during the drilling of the hole, the suction hood 16 will draw out of the hole the gases or fumes as fast as they are generated in the hole which is being drilled.

In the use and operation of this device for drilling a vertical hole, the hammer 10 is held in the usual vertical position and the drill bit 13 disposed against the work and at the same time the hood 16 may loosely engage against the upper face of the work. The coupling member 28 is adapted to be connected to a source of suction. The drill may be used in the normal manner and as the air or other fluid pressure is exhausted from the hammer 10, this fluid pressure will be discharged intermittently or in a pulsating manner through the hose 48 and the passage 46 of the distributing member 34 about the working end of the drill bit 13.

The air or other fluid pressure discharged through the passage 46 will agitate the cuttings and dust as the bit forms the cuttings and dust and this loose material will be removed from the hood 16 and from about the drill bit by the combined action of the positive fluid pressure and the negative pressure or suction formed in the suction hood 16.

A device constructed according to this invention has been placed in actual operation and has been found to be more efficient in effective elimination of dust, fumes and gases than devices of this character which have been heretofore available. It has been found from practical experience that the substantially complete elimination of dust around the drill bit and the cleaning of the hole formed by the bit cannot be accomplished by merely the use of suction or negative pressure. This is due to the fact that when the bit forms a hole having a depth of one inch or more, the suction or negative pressure will not pull out the cuttings or dust at the bottom of the hole whereas with a device of the type hereinbefore described, the dust and cuttings are agitated by the positive pressure which is of an intermittent character and the agitated dust and cuttings are then withdrawn by the negative pressure or suction at the hood 16.

It has also been found from practical experience that this device will operate efficiently without providing a tight connection between the drill bit and the upper end of the suction hood and without providing a tight fit between the open end of the suction hood and the adjacent face of the work.

Due to the compact structure of the combined dust collector and hole cleaning means hereinbefore described, the device will not impair the vision of the operator in working with the article and by reason of the compact nature, the device can be constructed at a reasonably low cost and will not get out of order because of hard usage.

Furthermore, due to the fact that this device may be loosely disposed with respect to the drill bit 13, it will not bind on the bit or become overheated during the operation of the drill. By collecting substantially all of the dust about the drill and drill bit, the operator is able to drill an increased number of holes and by removing the cuttings from the opening substantially as fast as the cuttings are formed, the bit can be used a longer period of time without resharpening, than is possible without the use of this device or with the devices heretofore available.

With a device of this type, the flying dust, cuttings and atmospheric impurities are confined entirely within the hood 16 so that the operator will not be injured thereby, and the operator may use the device without wearing protecting glasses or other similar devices.

What we claim is:

1. As a new article of manufacture a combined dust collecting and agitating hood for drills comprising a yieldable hood member having an open side engageable with the work and a drill bit receiving opening coaxial with said side, a laterally projecting suction nipple carried by said member for connection to a source of suction, an annular bit guide concentric of said hood member and disposed in the inner portion of the latter, said guide having a downwardly and inwardly directed fluid passage, and means extending from said guide and through said member for connecting said passage to a source of fluid pressure.

2. As a new article of manufacture, a combined dust collecting and agitating hood for drills comprising a hood member having an open side engageable with the work and a drill bit receiving opening coaxial with said side, a laterally projecting suction nipple carried by said member for connection to a source of suction, an annular bit guide in said hood inwardly adjacent said open side, means supporting said guide within and concentric of said hood member, said guide and said means having coacting portions providing a downwardly and inwardly directed fluid passage, means extending from said guide and supporting means and through the wall of the hood member for connecting said passage to a source of fluid pressure, and means in said connecting means for regulating the amount of fluid pressure to said passage.

3. As a new article of manufacture a combined dust collecting and agitating hood for drills comprising a cylindrical hood body, a laterally projecting suction nipple extending from said body, a reduced neck at one end of said body having a drill bit receiving opening, an enlarged intake member at the other end of said body, said intake member having an annular recess therein disposed inwardly from an adjacent end of said intake member, an annular supporting member in said recess, a reduced diameter drill bit guide encompassed by said supporting member, and radially arranged means securing said guide to said supporting member.

4. As a new article of manufacture a combined dust collecting and agitating hood for drills comprising a cylindrical hood body, a laterally projecting suction nipple extending from said body, a reduced neck at one end of said body having a drill bit receiving opening, an enlarged intake member at the other end of said body, said intake member having an annular recess therein disposed inwardly from an adjacent end of said intake member, an annular supporting member in said recess, a reduced diameter drill bit guide encompassed in spaced relation by said supporting member, radially arranged means securing said guide to said supporting member, said guide and securing means having coacting portions providing an inwardly and downwardly directed fluid passage whereby fluid under pressure may be directed downwardly about the lower end of the drill bit from below said guide for agitating the cuttings and dust about the working end of the bit, an upwardly and outwardly extending tube fixed to said guide, opening into said passage and extending outwardly through said intake member, and means connecting said tube to a source of fluid pressure supply including a metering member.

5. As a new article of manufacture a combined dust collecting and agitating hood for drills comprising a cylindrical hood body, a laterally projecting suction nipple extending from said body, a reduced neck at one end of said body having a drill bit receiving opening, an enlarged intake member at the other end of said body, said intake member having an annular recess therein disposed inwardly from an adjacent end of said intake member, an annular supporting member in said recess, a reduced diameter drill bit guide encompassed in spaced relation by said supporting member, radially arranged means securing said guide to said supporting member, said guide and securing means having coacting portions providing an inwardly and downwardly directed fluid passage whereby fluid under pressure may be directed downwardly about the lower end of the drill bit, from below said guide for agitating the cuttings and dust about the working end of the bit, an upwardly and outwardly extending tube fixed to said guide and securing means and extending outwardly through said intake member, a flexible hose connected at one end to said tube, and a combined connector and fluid pressure regulating means at the opposite end of said hose connected to a fluid pressure supply.

6. As a new article of manufacture, a combined dust collecting and agitating hood for drills comprising a cylindrical hood body, a laterally projecting suction nipple extending from said body, a reduced neck at one end of said body having a drill bit receiving opening, an enlarged intake member at the other end of said body, said intake member having an annular recess therein disposed inwardly from an adjacent end of said intake member, an annular supporting member in said recess, a reduced diameter drill bit guide, means securing said guide to said supporting member, said guide having an inwardly and downwardly directed fluid passage, whereby fluid under pressure may be directed downwardly about the drill bit for agitating the cuttings and dust about the working end of the bit, an upwardly and outwardly extending tube fixed to said guide and extending outwardly through said intake member, a flexible hose connected at one end to said tube, and a combined connector and fluid pressure regulating means at the opposite end of said hose for communication with a fluid pressure supply, said latter means including a cylindrical body formed with a reduced opening in a side thereof whereby the fluid pressure in said hose may be partially relieved.

7. In combination a drill bit, a pneumatic operator therefor having an air exhaust, a hollow hood open at its outer and inner ends, said hood at its outer end loosely engageable about the bit and at its inner end for bearing against the work, a bearing sleeve for the drill positioned within the hood at the outer terminal portion of the latter, a skeleton structure within the hood and spaced from the inner end of the latter, said structure including a bit guide disposed coaxially with said sleeve, said structure being formed with an air passage opening at the bottom thereof, exhaust air conducting means connected to said structure, opening into said passage and extending outwardly through the body of the hood, means for coupling said conducting means to the air exhaust of said pneumatic operator, and means for connecting said hood at a point above said structure to a source of suction.

8. In a combined dust collector and drilled hole cleaner having a yieldable hollow hood for positioning at one end against the work, encompassing a reciprocatory drill and having means for establishing communication between the interior thereof and a source of suction; the combination of an annular member mounted in and secured to the inner face of the hood in spaced relation to said end, an annular drill guide encompassed in spaced relation by said member, radially disposed spaced arms for securing said guide to said member, said guide and one of said arms being formed with coacting portions to provide an inclined pressure conducting passage directed towards the axis of the hood inwardly of said guide, a pressure conduit integral with one of said arms, opening into the intake end of said passage and extending outwardly through the body of said hood, and means for connecting said conduit to a pressure supply.

WARREN FRANKLIN TERRY.
RUSSELL EDWARD GOODENOUGH.